United States Patent

Bourdelais et al.

[11] Patent Number: 6,030,756
[45] Date of Patent: Feb. 29, 2000

[54] DAY/NIGHT PHOTOGRAPHIC DISPLAY MATERIAL WITH BIAXIALLY ORIENTED POLYOLEFIN SHEET

[75] Inventors: Robert P. Bourdelais, Pittsford; Peter T. Aylward, Hilton; Alphonse D. Camp; Michael R. Roberts, both of Rochester, all of N.Y.

[73] Assignee: Eastman Kodak Company, Rochester, N.Y.

[21] Appl. No.: 09/154,867

[22] Filed: Sep. 17, 1998

[51] Int. Cl.⁷ .............................. G03C 1/795; G03C 7/32
[52] U.S. Cl. .................... 430/363; 430/376; 430/533; 430/534; 430/536; 430/939; 430/950
[58] Field of Search .............. 430/15, 533, 534, 430/536, 939, 950, 502, 376, 363

[56] References Cited

U.S. PATENT DOCUMENTS

| | | | |
|---|---|---|---|
| 3,944,699 | 3/1976 | Mathews et al. | 428/220 |
| 4,187,113 | 2/1980 | Mathews et al. | 430/533 |
| 4,283,486 | 8/1981 | Aono et al. | 430/505 |
| 4,632,869 | 12/1986 | Park et al. | 428/315.5 |
| 4,758,462 | 7/1988 | Park et al. | 428/213 |
| 4,900,654 | 2/1990 | Pollock et al. | 430/533 |
| 4,912,333 | 3/1990 | Roberts et al. | |
| 4,977,070 | 12/1990 | Winslow | 430/510 |
| 5,055,371 | 10/1991 | Lee et al. | 430/126 |
| 5,100,862 | 3/1992 | Harrison et al. | 503/227 |
| 5,212,053 | 5/1993 | McSweeney et al. | 430/503 |
| 5,244,861 | 9/1993 | Campbell et al. | 430/201 |
| 5,387,501 | 2/1995 | Yajima et al. | 430/533 |
| 5,389,422 | 2/1995 | Okazaki et al. | 428/141 |
| 5,466,519 | 11/1995 | Shirakura et al. | 430/538 |
| 5,866,282 | 2/1999 | Bourdelais et al. | 430/536 |
| 5,888,643 | 3/1999 | Aylward et al. | 430/536 |
| 5,888,681 | 3/1999 | Gula et al. | 430/536 |

FOREIGN PATENT DOCUMENTS

| | | |
|---|---|---|
| 0 662 633 A1 | 12/1995 | European Pat. Off. . |
| WO 94/04961 | 3/1994 | WIPO . |

*Primary Examiner*—Richard L. Schilling
*Attorney, Agent, or Firm*—Paul A. Leipold

[57] ABSTRACT

The invention relates to an photographic element comprising a transparent polymer sheet, at least one layer of biaxially oriented polyolefin sheet and at least one image layer, wherein said polymer sheet has a stiffness of between 20 and 100 millinewtons said biaxially oriented polyolefin sheet has a spectral transmission between 35% and 90%, said biaxially oriented polyolefin sheet has a reflection density less than 65%.

19 Claims, No Drawings

DAY/NIGHT PHOTOGRAPHIC DISPLAY MATERIAL WITH BIAXIALLY ORIENTED POLYOLEFIN SHEET

FIELD OF THE INVENTION

This invention relates to photographic materials. In a preferred form it relates to base materials for photographic reflective and transmission display.

BACKGROUND OF THE INVENTION

It is known in the art that photographic display materials are utilized for advertising, as well as decorative displays of photographic images. Since these display materials are used in advertising, the image quality of the display material is critical in expressing the quality message of the product or service being advertised. Further, a photographic display image needs to be high impact, as it attempts to draw consumer attention to the display material and the desired message being conveyed. Typical applications for display material include product and service advertising in public places such as airports, buses and sports stadiums, movie posters, and fine art photography. The desired attributes of a quality, high impact photographic display material are a slight blue density minimum, durability, sharpness, and flatness. Cost is also important, as display materials tend to be expensive compared with alternative display material technology, mainly lithographic images on paper. For display materials, traditional color paper is undesirable, as it suffers from a lack of durability for the handling, photoprocessing, and display of large format images.

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult, requiring great care and expense to ensure proper laydown and cooling of the polyethylene layers. The formation of a suitably smooth surface would also improve image quality, as the display material would have more apparent blackness as the reflective properties of the improved base are more specular than the prior materials. As the whites are whiter and the blacks are blacker, there is more range in between and, therefore, contrast is enhanced. It would be desirable if a more reliable and improved surface could be formed at less expense.

Prior art photographic reflective papers comprise a melt extruded polyethylene layer which also serves as a carrier layer for optical brightener and other whitener materials, as well as tint materials. It would be desirable if the optical brightener, whitener materials and tints, rather than being dispersed a single melt extruded layer of polyethylene, could be concentrated nearer the surface where they would be more effective optically.

Prior art photographic display materials historically have been classified as either reflective or transmission. Reflective display materials typically are highly pigmented image supports with a light sensitive silver halide coating applied. Reflective display materials are typically used in commercial applications where an image is used to convey an idea or message. An application example of a reflective display material is product advertisement in a public area. Prior art reflective display materials have been optimized to provide a pleasing image using reflective light. Transmission display materials are used in commercial imaging applications and are typically backlit with a light source. Transmission display materials are typically a clear support with an incorporated diffuser coated with a light sensitive silver halide emulsion. Prior art transmission display materials have been optimized to provide a pleasing image when the image is backlit with a variety of light sources. Because prior art reflective and transmission products have been optimized to be either a reflection display image or a transmission display image, two separate product designs must exist in manufacturing and two inventories of display materials must be maintained at the commercial printer. Further, when the quality of the backlighting for transmission display material is reduced when, for example, a backlight burns out or the output of the backlight decreases with the age, the transmission image will appear dark and reduce the commercial value of the image. It would be desirable if an image support could function both as a reflection and transmission display material.

Prior art transmission display materials use a high coverage of light sensitive silver halide emulsion to increase the density of the image compared to photographic reflective print materials. While increasing the coverage does increase the density of the image in transmission space, the time to image development is also increased as the coverage increases. Typically, a high density transmission display material has a developer time of 110 seconds compared to a developer time of 45 seconds or less for photographic print materials. Prior art high density transmission display materials, when processed, reduce the productivity of the development lab. Further, coating a high coverage of emulsion requires additional drying of the emulsion in manufacturing, reducing the productivity of emulsion coating machines. It would be desirable if a transmission display material was high in density and had a developer time less than 50 seconds.

Prior art reflective photographic materials with a polyester base use a $TiO_2$ pigmented polyester base onto which light sensitive silver halide emulsions are coated. It has been proposed in WO 94/04961 to use an opaque polyester containing 10% to 25% $TiO_2$ for a photographic support. The $TiO_2$ in the polyester gives the reflective display materials an undesirable opalescent appearance. The $TiO_2$ pigmented polyester also is expensive because the $TiO_2$ must be dispersed into the entire thickness, typically from 100 to 180 $\mu$m. The $TiO_2$ also gives the polyester support a slight yellow tint which is undesirable for a photographic display material. For use as a photographic display material, the polyester support containing $TiO_2$ must be tinted blue to offset the yellow tint of the polyester, causing a loss in desirable whiteness and adding cost to the display material. It would be desirable if a reflective display support did not contain any $TiO_2$ in the base and could be concentrated near the light sensitive emulsion.

Prior art photographic display materials use polyester as a base for the support. Typically the polyester support is from 150 to 250 $\mu$m thick to provide the required stiffness. A thinner base material would be lower in cost and allow for roll handling efficiency, as the rolls would weigh less and be smaller in diameter. It would be desirable to use a base material that had the required stiffness but was thinner to reduce cost and improve roll handling efficiency.

PROBLEM TO BE SOLVED BY THE INVENTION

There is a continuing need for an improved product that will present a bright reflective image when viewed directly and also provide a sharp bright image when backlit.

SUMMARY OF THE INVENTION

It is an object of the invention to overcome disadvantages of display materials.

It is another object to provide a superior, lower cost, and stronger display material.

These and other objects of the invention are accomplished by a photographic element comprising a transparent polymer sheet, at least one layer of biaxially oriented polyolefin sheet and at least one image layer wherein said polymer sheet has a stiffness of between 20 and millinewtons said biaxially oriented polyolefin sheet has a spectral transmission between 35% and 90%, said biaxially oriented polyolefin sheet has a reflection density less than 65%.

ADVANTAGEOUS EFFECT OF THE INVENTION

The invention provides a material that will, when imaged and developed, result in a bright sharp reflective image, as well as allowing for backlighting of the image to also result in a clear sharp image in low light situations. In a preferred form the invention provides a product that may be provided with a silver halide image on each side but still retain a single exposure step and short processing time.

DETAILED DESCRIPTION OF THE INVENTION

The invention has numerous advantages over prior practices in the art. The invention provides a stronger material as the biaxially oriented polyolefin sheet provides flexural rigidity. The material, as it contains in its preferred form silver halide imaging layers on both sides of a polymer sheet, may be imaged by a collimated beam exposure device in a single exposure. As there are two relatively thin layers of silver halide image materials, the developing of the invention element may be carried out rapidly as the penetration of the developing solution is rapid through the thin layers of imaging material. The material of the invention is lower in cost as a thinner polyethylene terephthalate sheet may be utilized as strength is provided by the biaxially oriented polyolefin sheet. These and other advantages will be apparent from the detailed description below.

The terms as used herein, "top", "upper", "emulsion side", and "face" mean the side or toward the side of the laminated base carrying the biaxially oriented sheet. The terms "bottom", "lower side", and "back" mean the side or toward the side opposite of the top side where the biaxially oriented sheet is laminated. The term as used herein, "transparent" means the ability to pass radiation without significant deviation or absorption. For this invention, "transparent" material is defined as a material that has a spectral transmission greater than 90%. For a photographic element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The term as used herein, "duplitized" means light sensitive silver halide coating on the top side and the bottom side of the imaging support.

The layers of the biaxially oriented polyolefin sheet of this invention have levels of voiding, $TiO_2$ and colorants adjusted to provide optimum transmission and reflection properties. The biaxially oriented polyolefin sheet is laminated to a transparent polymer base for stiffness for efficient image processing, as well as product handling and display. An important aspect of this invention is that the imaging support coated with a light sensitive silver halide emulsion on both the top side and the bottom side. This duplitized silver halide coating, combined with the optical properties of the biaxially oriented sheet, provides an acceptable photographic display material that can be used in both reflection and transmission. The "dual" display material of this invention has significant commercial value in that prior art photographic display materials function as either a reflective display or a transmission display. It has been found that the duplitized emulsion coverage should be in a range that is greater than 60% and less than 125% of the typically emulsion coverage for reflective paper. It has been shown that the top side emulsion coverage of greater than 125% of the typical paper emulsion coverage resulted in significant and adverse attenuation of the imaging light which resulted in underexposure of the bottom side emulsion coating.

Any suitable biaxially oriented polyolefin sheet may be utilized for the sheet on the top side of the laminated base of the invention. Microvoided composite biaxially oriented sheets are preferred because the voids provide opacity without the use of $TiO_2$. Microvoided composite oriented sheets are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462; and 4,632,869.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 $\mu$m, preferably from 20 to 70 $\mu$m. Below 20 $\mu$m, the microvoided sheets may not be thick enough to minimize any inherent nonplanarity in the support and would be more difficult to manufacture. At thickness higher than 70 $\mu$m, little improvement in either surface smoothness or mechanical properties are seen, and so there is little justification for the further increase in cost for extra materials.

"Void" is used herein to mean devoid of added solid and liquid matter, although it is likely the "voids" contain gas. The void-initiating particles which remain in the finished packaging sheet core should be from 0.1 to 10 $\mu$m in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells and, thus, there is virtually no path open from one side of the voided-core to the other side through which gas or liquid can traverse.

The void-initiating material may be selected from a variety of materials, and should be present in an amount of about 5–50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above-described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate, and mixtures thereof.

Examples of typical monomers for making the cross-linked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield nonuniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension are preferred. As the agent, colloidal silica is preferred.

The void-initiating particles can also be inorganic spheres, including solid or hollow glass spheres, metal or ceramic beads or inorganic particles such as clay, talc, barium sulfate, and calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin film is utilized.

For the biaxially oriented sheets on the top side toward the emulsion, suitable classes of thermoplastic polymers for the biaxially oriented sheet and the core matrix-polymer of the preferred composite sheet comprise polyolefins. Suitable polyolefins include polypropylene, polyethylene, polymethylpentene, polystyrene, polybutylene, and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

The total thickness of the topmost skin layer or exposed surface layer should be between 0.20 $\mu$m and 1.5 $\mu$m, preferably between 0.5 and 1.0 $\mu$m. Below 0.5 $\mu$m any inherent non-planarity in the coextruded skin layer may result in unacceptable color variation. At skin thickness greater than 1.0 $\mu$m, there is a reduction in the photographic optical properties such as image resolution. At thickness greater that 1.0 $\mu$m there is also a greater material volume to filter for contamination such as clumps, poor color pigment dispersion, or contamination. Low density polyethylene with a density of 0.88 to 0.94 g/cc is the preferred material for the top skin because current emulsion formulation adheres well to low density polyethylene compared to other materials, such as polypropylene and high density polyethylene.

Addenda may be added to the topmost skin layer to change the color of the imaging element. For photographic use, a white base with a slight bluish tinge is preferred. The addition of the slight bluish tinge may be accomplished by any process which is known in the art including the machine blending of color concentrate prior to extrusion and the melt extrusion of blue colorants that have been preblended at the desired blend ratio. Colored pigments that can resist extrusion temperatures greater than 320° C. are preferred, as temperatures greater than 320° C. are necessary for coextrusion of the skin layer. Blue colorants used in this invention may be any colorant that does not have an adverse impact on the imaging element. Preferred blue colorants include Phthalocyanine blue pigments, Cromophtal blue pigments, Irgazin blue pigments, Irgalite organic blue pigments, and pigment Blue 60.

It has been found that a very thin coating (0.2 to 1.5 $\mu$m) on the surface immediately below the emulsion layer can be made by coextrusion and subsequent stretching in the width and length direction. It has been found that this layer is, by nature, extremely accurate in thickness and can be used to provide all the color corrections which are usually distributed throughout the thickness of the sheet between the emulsion and the paper base. This topmost layer is so efficient that the total colorants needed to provide a correction are less than one-half the amount needed if the colorants are dispersed throughout thickness. Colorants are often the cause of spot defects due to clumps and poor dispersions. Spot defects, which decrease the commercial value of images, are improved with this invention because less colorant is used, and high quality filtration to clean up the colored layer is much more feasible since the total volume of polymer with colorant is only typically 2 to 10 percent of the total polymer between the base paper and the photosensitive layer.

While the addition of $TiO_2$ in the thin skin layer of this invention does not significantly contribute to the optical performance of the sheet, it can cause numerous manufacturing problems such as extrusion die lines and spots. The skin layer substantially free of $TiO_2$ is preferred. $TiO_2$ added to a layer between 0.20 and 1.5 μm does not substantially improve the optical properties of the support, will add cost to the design and will cause objectionable pigments lines in the extrusion process.

Addenda may be added to the biaxially oriented sheet of this invention so that when the biaxially oriented sheet is viewed from a surface, the imaging element emits light in the visible spectrum when exposed to ultraviolet radiation. Emission of light in the visible spectrum allows for the support to have a desired background color in the presence of ultraviolet energy. This is particularly useful when images are viewed outside, as sunlight contains ultraviolet energy and may be used to optimize image quality for consumer and commercial applications.

Addenda known in the art to emit visible light in the blue spectrum are preferred. Consumers generally prefer a slight blue tint to white defined as a negative b* compared to a white white defined as a b* within one b* unit of zero. b* is the measure of yellow/blue in CIE space. A positive b* indicates yellow, while a negative b* indicates blue. The addition of addenda that emits in the blue spectrum allows for tinting the support without the addition of colorants which would decrease the whiteness of the image. The preferred emission is between 1 and 5 delta b* units. Delta b* is defined as the b* difference measured when a sample is illuminated ultraviolet light source and a light source without any significant ultraviolet energy. Delta b* is the preferred measure to determine the net effect of adding an optical brightener to the top biaxially oriented sheet of this invention. Emissions less than 1 b* unit cannot be noticed by most customers; therefore, is it not cost effective to add only that amount of optical brightener to the biaxially oriented sheet. An emission greater that 5 b* units would interfere with the color balance of the prints making the whites appear too blue for most consumers.

The preferred addenda of this invention is an optical brightener. An optical brightener is a colorless, fluorescent, organic compound that absorbs ultraviolet light and emits it as visible blue light. Examples include but are not limited to derivatives of 4,4'-diaminostilbene-2,2'-disulfonic acid, coumarin derivatives such as 4-methyl-7-diethylaminocoumarin, 1-4-Bis(O-Cyanostyryl) Benzol and 2-Amino-4-Methyl Phenol.

The optical brightener may be added to any layer in the multilayer coextruded biaxially oriented polyolefin sheet. The preferred location is adjacent to or in the exposed surface layer of said sheet. This allows for the efficient concentration of optical brightener which results in less optical brightener being used when compared to traditional photographic supports. When the desired weight % loading of the optical brightener begins to approach the concentration at which the optical brightener migrates to the surface of the support forming crystals in the imaging layer, the addition of optical brightener into the layer adjacent to the exposed layer is preferred. When optical brigntener migration is a concern as with light sensitive silver halide imaging systems, the preferred top layer comprises polyethylene. In this case, the migration from the layer adjacent to the exposed layer is significantly reduced allowing for much higher optical brightener levels to be used to optimize image quality. Locating the optical brightener in the layer adjacent to the top polyethylene layer allows for a less expensive optical brightener to be used. The top polyethylene layer, which is substantially free of optical brightener, prevents significant migration of the optical brightener. A preferred method to reduce unwanted optical brightener migration is to use polypropylene for the layer adjacent to the top surface of the biaxially oriented polyolefin sheet. Since optical brightener is more soluble in polypropylene than polyethylene, the optical brightener is less likely to migrate from polypropylene.

A biaxially oriented sheet of this invention which has a microvoided core is preferred. The microvoided core adds opacity and whiteness to the imaging support further improving imaging quality. Combining the image quality advantages of a microvoided core with a material, which absorbs ultraviolet energy and emits light in the visible spectrum, allows for the unique optimization of image quality, as the image support can have a tint when exposed to ultraviolet energy, yet retain excellent whiteness when the image is viewed using lighting that does not contain significant amounts of ultraviolet energy such as indoor lighting. The preferred number of voids in the vertical direction at substantially every point is greater than six. The number of voids in the vertical direction is the number of polymer/gas interfaces present in the voided layer. The voided layer functions as an opaque layer because of the index of refraction changes between polymer/gas interfaces. Greater than 6 voids is preferred because at 4 voids or less, little improvement in the opacity of the film is observed and, thus, does not justify the added expense to void the biaxially oriented sheet of this invention.

The microvoided core of the biaxially oriented sheet of this invention also increases the opacity of the image element without the use of $TiO_2$ or other white pigments. During the printing process in which a latent image is formed in the image layers, simultaneous exposure of imaging layers of the top and bottom sides is preferred to reduce development time and increase image density. $TiO_2$ in the support structure will tend to scatter the exposure light causing unwanted exposure. The voided layer, while providing opacity, also allows for the transmission of light without unwanted exposure.

The biaxially oriented sheet may also contain pigments which are known to improve the photographic responses such as whiteness or sharpness. Titanium dioxide is used in this invention to improve image sharpness. The $TiO_2$ used may be either anatase or rutile type. In the case of optical properties, rutile is the preferred because of the unique particle size and geometry. Further, both anatase and rutile $TiO_2$ may be blended to improve both whiteness and sharpness. Examples of $TiO_2$ that are acceptable for a photographic system are DuPont Chemical Co. R101 rutile $TiO_2$ and DuPont Chemical Co. R104 rutile $TiO_2$. Other pigments to improve photographic responses may also be used in this invention such as titanium dioxide, barium sulfate, clay, or calcium carbonate.

The preferred amount of $TiO_2$ added to the biaxially oriented sheet of this invention is between 3 and 18% by weight. Below 2% $TiO_2$, the required reflection density of the biaxially oriented sheet is difficult to obtain. Above 20%, the desired transmission characteristics are difficult to obtain. Further, above 20% $TiO_2$, manufacturing efficiency declines because of melt extrusion problems associated with the use of $TiO_2$ such as plate out on the screw, die manifold, and die lips.

For a display material to function both as a reflective display and a backlit transmission display material, the support must function as an acceptable reflective support and allow enough light to be transmitted so that support can also function as a transmission material. Further, transmission and reflection properties must be managed so that the photographic display material can be simultaneously exposed on the top side and bottom sides. The preferred exposure method is from the top side of the imaging element. Simultaneous exposure is performed by light exposing the top side light sensitive coating, traveling through the support structure, and exposing the bottom side light sensitive coating.

Due to the nature of transmission viewing materials with incorporated diffusers, (the fact that the material is captured or suspended in a viewing box which contains an illumination source and an air interface between the illumination source and the display material) more transmissiviness of the display material can be tolerated and still appear sufficiently opaque in the reflection mode, while allowing for maximum transmission when used in a backlit mode. This transmissiveness also enables the image formation step for the duplitized coating, as the increased transmissiveness allows for more of the imaging light to reach the backside light sensitive silver halide emulsion coating.

The preferred spectral transmission of the biaxially oriented polyolefin sheet of this invention is between 35% and 90%. Spectral transmission is the amount of light energy that is transmitted through a material. For a photographic element, spectral transmission is the ratio of the transmitted power to the incident power and is expressed as a percentage as follows: $T_{RGB}=10^{-D}*100$ where D is the average of the red, green, and blue Status A transmission density response measured by an X-Rite model 310 (or comparable) photographic transmission densitometer. The higher the transmission, the less opaque the material. Since the display material of this invention functions as both a reflective image and a transmission image, the % transmission of the biaxially oriented sheet must be balanced to provide an acceptable reflection and transmission image. The preferred spectral transmission of the biaxially oriented polyolefin sheet of this invention is between 35% and 90% because a % transmission of the biaxially oriented sheet less than 30%, while producing an acceptable reflection image, does not allow sufficient light to be transmitted to produce an acceptable image. A % transmission of the biaxially oriented sheet greater than 90% is unacceptable for a quality reflection image, as not enough light is reflected back to the observer's eye.

A reflection density less than 65% for the biaxially oriented sheet of this invention is preferred. Reflection density is the amount of light energy reflecting from the image to an observer's eye. Reflection density is measured by 0°/45° geometry Status A red/green/blue response using an X-Rite model 310 (or comparable) photographic transmission densitometer. A sufficient amount of reflective light energy is required to give the perception of image quality. A reflection density less than 70% is unacceptable for a reflective display material and does not match the quality of prior art reflective display materials. The most preferred reflection density for the biaxially oriented sheets of this invention is between 58% and 62%. This range allows for optimization of transmission and reflection properties to create a display material that may be used for both a reflective and transmission display material.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. A stretching ratio, defined as the final length divided by the original length for sum of the machine and cross directions, of at least 10 to 1 is preferred. After the sheet has been stretched, it is heat set by heating to a temperature sufficient to crystallize or anneal the polymers, while restraining to some degree the sheet against retraction in both directions of stretching.

The composite sheet, while described as having preferably at least three layers of a core and a skin layer on each side, may also be provided with additional layers that may serve to change the properties of the biaxially oriented sheet. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photosensitive layers. Examples of this would be acrylic coatings for printability, coating polyvinylidene chloride for heat seal properties. Further examples include flame, plasma, or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a preferred biaxially oriented sheet where the exposed surface layer is adjacent to the imaging layer is as follows:

| |
|---|
| Polyethylene skin with blue pigments |
| Polypropylene with TiO₂ and optical brightener |
| Polypropylene microvoided layer |
| Polypropylene bottom skin layer |

The support to which the microvoided composite sheets and biaxially oriented sheets are laminated for the laminated support of the photosensitive silver halide layer may be any material with the desired transmission and stiffness properties. Photographic elements of the invention can be prepared on any suitable transparent photographic quality support including sheets of various kinds of synthetic paper such as polystyrene, ceramics, synthetic high molecular weight sheet materials such as polyalkyl acrylates or methacrylates, polystyrene, polyamides such as nylon, sheets of semisynthetic high molecular weight materials such as cellulose nitrate, cellulose acetate butyrate, and the like; homo and copolymers of vinyl chloride, poly(vinylacetal), polycarbonates, homo and copolymers of olefins such as polyethylene and polypropylene, and the like.

Polyester sheets are particularly advantageous because they provide excellent strength and dimensional stability. Such polyester sheets are well known, widely used, and typically prepared from high molecular weight polyesters prepared by condensing a dihydric alcohol with a dibasic saturated fatty acid or derivative thereof.

Suitable dihydric alcohols for use in preparing such polyesters are well known in the art and include any glycol wherein the hydroxyl groups are on the terminal carbon atom and contain from 2 to 12 carbon atoms such as, for example, ethylene glycol, propylene glycol, trimethylene glycol, hexamethylene glycol, decamethylene glycol, dodecamethylene glycol, 1,4-cyclohexane, dimethanol, and the like.

Suitable dibasic acids useful for the preparation of polyesters include those containing from 2 to 16 carbon atoms such as adipic acid, sebacic acid, isophthalic acid, terephthalic acid, and the like. Alkyl esters of acids, such as those listed above, can also be employed. Other alcohols and acids, as well as polyesters prepared therefrom and the preparation of the polyesters, are described in U.S. Pat. Nos. 2,720,503 and 2,901,466 which are hereby incorporated herein by reference. Polyethylene terephthalate is preferred.

Polyester support thickness can range from about 15 millinewtons to 100 millinewtons. The preferred stiffness is between 20 and 100 millinewtons. Polyester stiffness less than 15 millnewtons does not provide the required stiffness for display materials in that they will be difficult to handle and do not lay flat for optimum viewing. Polyester stiffness greater than 100 millinewtons begins to exceed the stiffness limit for processing equipment and has no performance benefit for the display materials.

Generally polyester film supports are prepared by melt extruding the polyester through a slit die, quenching to the amorphous state, orienting by machine and cross direction stretching, and heat setting under dimensional restraint. The polyester film can also be subjected to a heat relaxation treatment to improve dimensional stability and surface smoothness.

The polyester film will typically contain a subbing undercoat or primer layer on both sides of the polyester film. Subbing layers used to promote adhesion of coating compositions to the support are well known in the art, and any such material can be employed. Some useful compositions for this purpose include interpolymers of vinylidene chloride such as vinylidene chloride/methyl acrylate/itaconic acid terpolymers or vinylidene chloride/acrylonitrile/acrylic acid terpolymers, and the like. These and other suitable compositions are described, for example, in U.S. Pat. Nos. 2,627,088; 2,698,240; 2,943,937; 3,143,421; 3,201,249; 3,271,178; 3,443,950; and 3,501,301. For photographic use, the polymeric subbing layer is usually overcoated with a second subbing layer comprised of gelatin, typically referred to as gel sub.

A transparent polymer base free of TiO₂ is preferred because the TiO₂ in the transparent polymer gives the reflective display materials an undesirable opalescent appearance. The TiO₂ pigmented transparent polymer also is expensive because the TiO₂ must be dispersed into the entire thickness, typically from 100 to 180 μm. The TiO₂ also gives the transparent polymer support a slight yellow tint which is undesirable for a photographic display material. For use as a photographic reflective display material, a transparent polymer support containing TiO₂ generally is tinted blue to offset the yellow tint of the polyester causing a loss in desired whiteness and adding cost to the display material. Concentration of the white pigment in the polyolefin layer allows for efficient use of the white pigment which improves image quality and reduces the cost of the imaging support.

When using a polyester base or other transparent polymer base, it is preferable to extrusion laminate the microvoided composite sheets to the base polymer using a polyolefin resin. Extrusion laminating is carried out by bringing together the biaxially oriented sheets of the invention and the polyester base with application of an melt extruded adhesive between the polyester sheets and the biaxially oriented polyolefin sheets, followed by their being pressed in a nip such as between two rollers. The melt extruded adhesive may be applied to either the biaxially oriented sheets or the base polymer prior to their being brought into the nip. In a preferred form the adhesive is applied into the nip simultaneously with the biaxially oriented sheets and the base polymer. The adhesive used to adhere the biaxially oriented polyolefin sheet to the polyester base may be any suitable material that does not have a harmful effect upon the photographic element. A preferred material is metallocene catalyzed ethylene plastomers that are melt extruded into the nip between the polymer and the biaxially oriented sheet. Metallocene catalyzed ethylene plastomers are preferred because they are easily melt extruded, adhere well to biaxially oriented polyolefin sheets of this invention, and adhere well to gelatin sub coated polyester support of this invention.

The structure of a preferred reflection/transmission display support where the imaging layers are applied to the biaxially oriented polyolefin sheet is as follows:

| |
|---|
| Biaxially oriented polyolefin sheet |
| Metallocene catalyzed ethylene plastomer |
| Polyester base |

As used herein, the phrase "photographic element" is a material that utilizes photosensitive silver halide in the formation of images. The photographic elements can be black-and-white, single color elements, or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

For the display material of this invention, at least one image layer containing silver halide and a dye forming coupler located on the top side or bottom side of said imaging element is suitable. Applying the imaging layer to either the top or bottom is suitable for a photographic display material, but it is not sufficient to create a photographic display material that is optimum for both a reflective display and a transmission display. For the display material of this invention, at least one image layer comprising at least one dye forming coupler located on both the top and bottom of the imaging support of this invention is preferred. Applying an image layer to both the top and bottom of the support allows for the display material to have the required density for reflective viewing and for transmission viewing of the image. This duplitized "day/night" photographic display material has significant commercial value in that the day/night display material can be used for both reflective viewing and transmission viewing. Prior art display materials were optimized for either transmission viewing or reflective viewing, but not both simultaneously.

It has been found that the duplitized emulsion top coverage should be in a range that is greater than 60% and less than 125% of the of typical emulsion coverages for reflective consumer paper that contains typical amounts of silver and coupler. It has been shown that the top side emulsion coverage of greater than 125% for the typical emulsion coverage resulted in significant and adverse attenuation of the imaging light which resulted in underexposure of the bottom side emulsion coating.

The display material of this invention wherein at least one dye forming coupler on the bottom side of the imaging support has the same or less dye forming coupler than the imaging layer on the top side is preferred because it allows for an increase in image density without increasing developer time. The display material of this invention wherein the amount of dye forming coupler is substantially the same on the top and bottom sides is most preferred because it allows for optimization of image density, while allowing for developer time less than 50 seconds. Further, coating substantially the same amount of light sensitive silver halide emulsion on both sides has the additional benefit of balancing the imaging element for image curl caused by the contraction and expansion of the hydroscopic gel typically found in photographic emulsions.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride, and optimally greater than about 95 mole percent silver chloride.

The silver halide emulsions can contain grains of any size and morphology. Thus, the grains may take the form of cubes, octahedrons, cubooctahedrons, or any of the other naturally occurring morphologies of cubic lattice type silver halide grains. Further, the grains may be irregular such as spherical grains or tabular grains: Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23, 113 (1979). Examples of processes for preparing intentionally reduction sensitized silver halide emulsions are described in EP 0 348 934 A1 (Yamashita), EP 0 369 491 (Yamashita), EP 0 371 388 (Ohashi), EP 0 396 424 A1 (Takada), EP 0 404 142 A1 (Yamada), and EP 0 435 355 A1 (Makino).

The photographic elements of this invention may use emulsions doped with Group VIII metals such as iridium, rhodium, osmium, and iron as described in *Research*

*Disclosure*, September 1994, Item 36544, Section I, published by Kenneth Mason Publications, Ltd., Dudley Annex, 12a North Street, Emsworth, Hampshire PO10 7DQ, ENGLAND. Additionally, a general summary of the use of the color paper examples of sections XVI and XVII. The couplers of section II are also particularly suitable. The Magenta I couplers of section II, particularly M-7, M-10, M-11, and M-18 set forth below are particularly desirable.

M-7

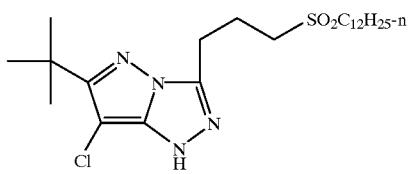

M-10

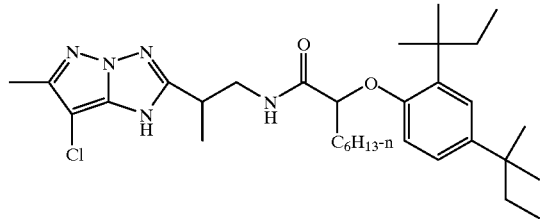

M-11

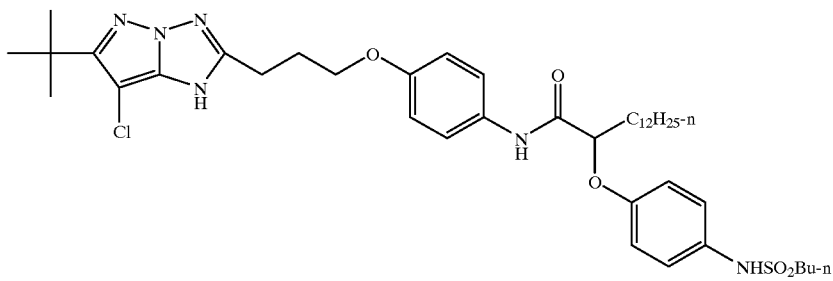

M-18

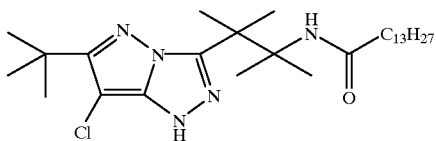

iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black-and-white photographic print elements.

The invention may be utilized with the materials disclosed in *Research Disclosure*, 40145 of September 1997. The invention is particularly suitable for use with the materials of The element of the invention may contain an antihalation layer. A considerable amount of light may be diffusely transmitted by the emulsion and strike the back surface of the support. This light is partially or totally reflected back to the emulsion and reexposed it at a considerable distance from the initial point of entry. This effect is called halation because it causes the appearance of halos around images of bright objects. Further, a transparent support also may pipe light. Halation can be greatly reduced or eliminated by absorbing the light transmitted by the emulsion or piped by the support. Three methods of providing halation protection are (1) coating an antihalation undercoat which is either dye gelatin or gelatin containing gray silver between the emulsion and the support, (2) coating the emulsion on a support that contains either dye or pigments, and (3) coating the emulsion on a transparent support that has a dye to pigment a layer coated on the back. The absorbing material contained in the antihalation undercoat or antihalation backing is removed by processing chemicals when the photographic element is processed. The dye or pigment within the support is permanent and generally is not preferred for the instant invention. In the instant invention, it is preferred that the antihalation layer be formed of gray silver which is coated on the side furthest from the top and removed during processing. By coating furthest from the top on the back surface, the antihalation layer is easily removed, as well as allowing exposure of the duplitized material from only one side. If the material is not duplitized, the gray silver could be coated between the support and the top emulsion layers where it would be most effective. The problem of halation is minimized by coherent collimated light beam exposure, although improvement is obtained by utilization of an antihalation layer even with collimated light beam exposure.

In order to successfully transport display materials of the invention, the reduction of static caused by web transport through manufacturing and image processing is desirable. Since the light sensitive imaging layers of this invention can be fogged by light from a static discharge accumulated by the web as it moves over conveyance equipment such as rollers and drive nips, the reduction of static is necessary to avoid undesirable static fog. The polymer materials of this invention have a marked tendency to accumulate static charge as they contact machine components during transport. The use of an antistatic material to reduce the accumulated charge on the web materials of this invention is desirable. Antistatic materials may be coated on the web materials of this invention and may contain any known materials in the art which can be coated on photographic web materials to reduce static during the transport of photographic paper. Examples of antistatic coatings include conductive salts and colloidal silica. Desirable antistatic properties of the support materials of this invention may also be accomplished by antistatic additives which are an integral part of the polymer layer. Incorporation of additives that migrate to the surface of the polymer to improve electrical conductivity include fatty quaternary ammonium compounds, fatty amines, and phosphate esters. Other types of antistatic additives are hygroscopic compounds such as polyethylene glycols and hydrophobic slip additives that reduce the coefficient of friction of the web materials. An antistatic coating applied to the opposite side of the image layer or incorporated into the backside polymer layer is preferred. The backside is preferred because the majority of the web contact during conveyance in manufacturing and photoprocessing is on the backside. The preferred surface resistivity of the antistat coat at 50% RH is less than $10^{13}$ ohm/square. A surface resistivity of the antistat coat at 50% RH is less than $10^{13}$ ohm/square has been shown to sufficiently reduce static fog in manufacturing and during photoprocessing of the image layers.

The invention photographic imaging members may contain matte beads to help aid in stacking, winding, and unwinding of the photographic members without damage. Matte beads are known in the formation of prior dislay imaging materials. The matte beads may be applied on the top or bottom of the imaging members. Generally, if applied on the emulsion side, the beads are below the surface protective layer (SOC).

In the following Table, reference will be made to (1) Research Disclosure, December 1978, Item 17643, (2) Research Disclosure, December 1989, Item 308119, and (3) Research Disclosure, September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
|---|---|---|
| 1 | I, II | Grain composition, |
| 2 | I, II, IX, X, XI, XII, XIV, XV | morphology and preparation. Emulsion preparation |
| | I, II, III, IX | including hardeners, coating aids, addenda, etc. |
| 3 | A & B | |
| 1 | III, IV | Chemical sensitization and |
| 2 | III, IV | spectral sensitization/ |
| 3 | IV, V | desensitization |
| 1 | V | UV dyes, optical brighteners, |
| 2 | V | luminescent dyes |
| 3 | VI | |
| 1 | VI | |
| 2 | VI | Antifoggants and stabilizers |
| 3 | VII | |
| 1 | VIII | |
| 2 | VIII, XIII, XVI | Absorbing and scattering materials; Antistatic layers; |
| 3 | VIII, IX C & D | matting agents |
| 1 | VII | Image-couplers and image- |
| 2 | VII | modifying couplers; Dye |
| 3 | X | stabilizers and hue modifiers |
| 1 | XVII | |
| 2 | XVII | Supports |
| 3 | XV | |
| 3 | XI | Specific layer arrangements |
| 3 | XII, XIII | Negative working emulsions; Direct positive emulsions |
| 2 | XVIII | Exposure |
| 3 | XVI XIX, XX | |
| 2 | XIX, XX XXII | Chemical processing; Developing agents |
| 3 | XVIII, XIX, XX | |
| 3 | XIV | Scanning and digital processing procedures |

The photographic elements can be exposed with various forms of energy which encompass the ultaviolet, visible, and infrared regions of the electromagnetic spectrum, as well as with electron beam, beta radiation, gamma radiation, X ray, alpha particle, neutron radiation, and other forms of corpuscular and wavelike radiant energy in either noncoherent (random phase) forms or coherent (in phase) forms, as produced by lasers. When the photographic elements are intended to be exposed by X rays, they can include features found in conventional radiographic elements.

The preferred reflective/transmission display materials of this invention wherein said imaging element comprises at least one dye forming layer comprising silver halide and dye forming coupler on the opposite side of said transparent polymer sheet from the biaxially oriented polyolefin sheet and said exposure of both coupler containing layers is from the side of said imaging element having the biaxially oriented polyolefin sheet is preferred. This allows for traditional image processing equipment to be used. The imaging elements of this invention are preferably exposed by means of a collimated beam, to form a latent image, and then processed to form a visible image, preferably by other than heat treatment. A collimated beam is preferred, as it allows for digital printing and simultaneous exposure of the imaging layer on the top and bottom side without significant internal light scatter. A preferred example of a collimated beam is a laser also known as light amplification by stimulated emission of radiation. The laser is preferred because this technology is used widely in a number of digital printing equipment types. Further, the laser provides sufficient energy to simultaneously expose the light sensitive silver halide coating on the top and bottom side of the display material of this invention without undesirable light scatter. Subsequent processing of the latent image into a visible image is preferably carried out in the known RA-4™ (Eastman Kodak Company) Process or other processing systems suitable for developing high chloride emulsions.

The following examples illustrate the practice of this invention. They are not intended to be exhaustive of all possible variations of the invention. Parts and percentages are by weight unless otherwise indicated.

EXAMPLES

Example 1

Since this invention is for a display material that functions as both a reflective and transmission display material, no comparisons can be made with prior materials.

The following laminated photographic display material (invention) was prepared by extrusion laminating the following sheet to top side of a photographic grade polyester base:

Top Sheet (Emulsion side)

A composite sheet consisting of 5 layers identified as L1, L2, L3, L4, and L5. L1 is the thin-colored layer on the outside (top) of the package to which the photosensitive silver halide layer was attached. L2 is the layer to which optical brightener and 6% $TiO_2$ was added. The optical brightener used was Hostalux KS manufactured by Ciba-Geigy. The rutile $TiO_2$ used was DuPont R104 (a 0.22 $\mu$m particle size $TiO_2$). Table 1 below lists the characteristics of the layers of the top biaxially oriented sheet used in this example.

TABLE 1

| Layer | Material | Thickness, $\mu$ |
|---|---|---|
| L1 | LD Polyethylene + color concentrate | 0.75 |
| L2 | Polypropylene + $TiO_2$ + OB | 4.32 |
| L3 | Voided Polypropylene | 24.9 |
| L4 | Polypropylene | 4.32 |
| L5 | Polypropylene | 0.762 |
| L6 | LD Polyethyiene | 11.4 |

Photographic Grade Polyester Base

A polyethylene terephthalate sheet base 110 $\mu$m thick that was transparent and has gelatin sub on both sides of the base. The polyethylene terephthalate base had a stiffness of 30 millinewtons in the machine direction and 40 millinewtons in the cross direction.

The top sheet used in this example was coextruded and biaxially oriented. The top sheet was melt extrusion laminated to the paper base using an metallocene catalyzed ethylene plastomer (SLP 9088) manufactured by Exxon Chemical Corp. The metallocene catalyzed ethylene plastomer had a density of 0.900 g/cc and a melt index of 14.0.

The L3 layer for the biaxially oriented sheet is microvoided and further described in Table 2 where the refractive index and geometrical thickness is shown for measurements made along a single slice through the L3 layer. The measurements do not imply continuous layers, as a slice along another location would yield different but approximately the same thickness. The areas with a refractive index of 1.0 are voids that are filled with air and the remaining layers are polypropylene.

TABLE 2

| Sublayer of L3 | Refractive Index | Thickness, $\mu$m |
|---|---|---|
| 1 | 1.49 | 2.54 |
| 2 | 1 | 1.527 |
| 3 | 1.49 | 2.79 |
| 4 | 1 | 1.016 |
| 5 | 1.49 | 1.778 |
| 6 | 1 | 1.016 |
| 7 | 1.49 | 2.286 |
| 8 | 1 | 1.016 |
| 9 | 1.49 | 2.032 |
| 10 | 1 | 0.762 |
| 11 | 1.49 | 2.032 |
| 12 | 1 | 1.016 |
| 13 | 1.49 | 1.778 |
| 14 | 1 | 1.016 |
| 15 | 1.49 | 2.286 |

Coating format 1 was utilized to prepare photographic reflective/transmission display material. The same coverage was coated on both the L1 polyethylene layer on the top biaxially oriented sheet and on the bottom gel sub layer.

| | Coating Format 1 | Laydown mg/m$^2$ |
|---|---|---|
| Layer 1 | Blue Sensitive | |
| | Gelatin | 1300 |
| | Blue sensitive silver | 200 |
| | Y-1 | 440 |
| | ST-1 | 440 |
| | S-1 | 190 |
| Layer 2 | Interlayer | |
| | Gelatin | 650 |
| | SC-1 | 55 |
| | S-1 | 160 |
| Layer 3 | Green Sensitive | |
| | Gelatin | 1100 |
| | Green sensitive silver | 70 |
| | M-1 | 270 |
| | S-1 | 75 |
| | S-2 | 32 |
| | ST-2 | 20 |
| | ST-3 | 165 |
| | ST-4 | 530 |
| Layer 4 | UV Interlayer | |
| | Gelatin | 635 |
| | UV-1 | 30 |
| | UV-2 | 160 |
| | SC-1 | 50 |
| | S-3 | 30 |
| | S-1 | 30 |
| Layer 5 | Red Sensitive Layer | |
| | Gelatin | 1200 |
| | Red sensitive silver | 170 |
| | C-1 | 365 |
| | S-1 | 360 |
| | UV-2 | 235 |
| | S-4 | 30 |
| | SC-1 | 3 |
| Layer 6 | UV Overcoat | |
| | Gelatin | 440 |
| | UV-1 | 20 |
| | UV-2 | 110 |
| | SC-1 | 30 |
| | S-3 | 20 |
| | S-1 | 20 |

-continued

| | Coating Format 1 | Laydown mg/m² |
|---|---|---|
| Layer 7 | SOC | |
| | Gelatin | 490 |
| | SC-1 | 17 |
| | SiO² | 200 |
| | Surfactant | 2 |

APPENDIX

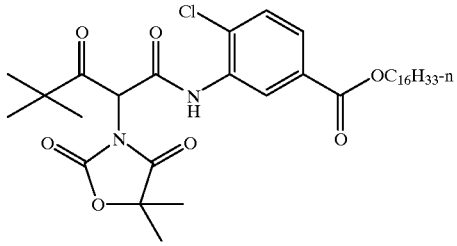

Y-1

ST-1 = N-tert-butylacrylamide/n-butyl acrylate copolymer (50:50)

S-1 = dibutyl phthalate

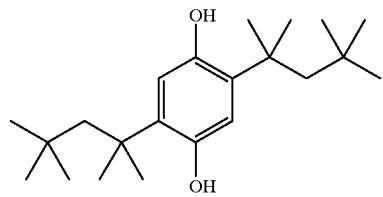

SC-1

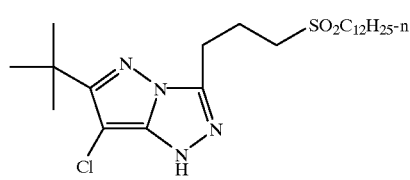

M-1

S-2 = diundecyl phthalate

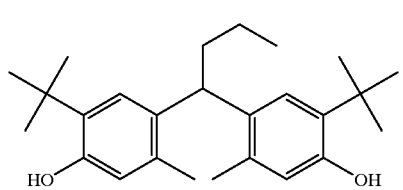

ST-2

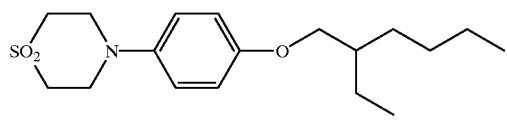

ST-3

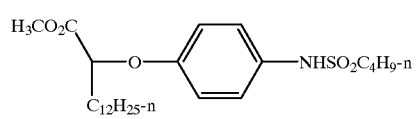

ST-4

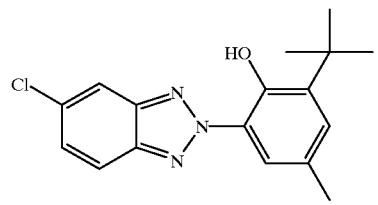

UV-1

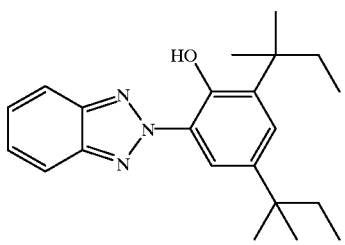

UV-2

S-3 = 1,4-Cyclohexyldimethylene bis(2-ethylhexanoate)

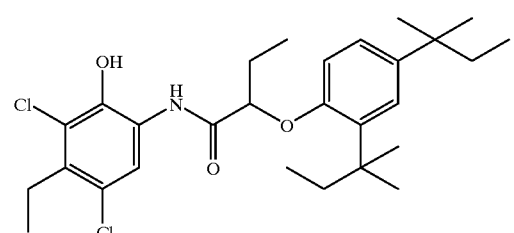

C-1

S-4 = 2-(2-Butoxyethoxy)ethyl acetate

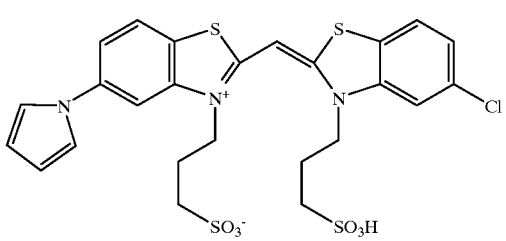

Dye 1

The structure of the invention in this example was as follows:

| |
|---|
| 5 layer biaxially oriented polyolefin sheet containing OB, TiO₂ and blue tints |
| Metallcoene ethylene plastomer |
| Clear gelatin sub coating |
| Transparent polyester base |
| Clear gelatin sub coating |
| Coating format 1 |

The bending stiffness of the polyester base and the laminated display material support, prior to coating with Format 1, was measured by using the Lorentzen and Wettre stiffness tester, Model 16D. The output from this instrument is force, in millinewtons, required to bend the cantilevered, unclasped end of a sample 20 mm long and 38.1 mm wide at an angle of 15 degrees from the unloaded position. In this test the stiffness in both the machine direction and cross direction of the polyester base was compared to the stiffness of the base laminated with the top biaxially oriented sheet of this example. The results are presented in Table 3.

TABLE 3

|  | Machine Direction Stiffness (millinewtons) | Cross Direction Stiffness (millinewtons) |
| --- | --- | --- |
| Before Lamination | 33 | 23 |
| After Lamination | 87 | 80 |

The data above in Table 3 show the significant increase in stiffness of the polyester base after lamination with a biaxially oriented polymer sheet. This result is significant in that prior art materials, in order to provide the necessary stiffness, used polyester bases that were much thicker (between 150 and 256 μm) compared to the 110 μm polyester base used in this example. At equivalent stiffness, the significant increase in stiffness after lamination allows for a thinner polyester base to be used compared to prior art materials, thus reducing the cost of the reflective display support. Further, a reduction in reflective display material thickness allows for a reduction in material handling costs, as rolls of thinner material weigh less and are smaller in roll diameter.

The display material was processed as a minimum density. The display support was measured for status A density using an X-Rite Model 310 photographic densitometer. Spectral transmission is calculated from the Status A density readings and is the ratio of the transmitted power to the incident power and is expressed as a percentage as follows: $T_{RGB}=10^{-D}*100$ where D is the average of the red, green, and blue Status A transmission density response. The display material were also measured for L*, a*, and b* using a Spectrogard spectrophotometer, CIE system, using illuminant D6500. In the transmission mode, a qualitative assessment was made as to the amount of illuminating backlighting show through. A substantial amount of show through would be considered undesirable as the non fluorescent light sources could interfere with the image quality. The comparison data for invention and control are listed in Table 4 below.

TABLE 4

| Measure | Invention measured in Transmission |
| --- | --- |
| % Transmission | 38% |
| CIE D6500 L* | 55.69 |
| CIE D6500 a* | −0.09 |
| CIE D6500 b* | 4.47 |
| Illuminating Backlight Showthrough | None |

The reflection/transmission display support coated on the top and bottom sides with the light sensitive silver halide coating format of this example exhibits all the properties needed for a photographic display material that can function as both a reflective and transmission display material. Further, the photographic reflection/transmission display material of this example has many advantages over prior art photographic display materials. The nonvoided layers have levels of $TiO_2$ and colorants adjusted to provide an improved minimum density position compared to prior art reflective display materials or prior art transmission display materials as the invention was able to overcome the native yellowness of the processed emulsion layers (b* for the invention was 4.47 compared to a typical b* of 7.0 to 12.0 for prior art transmission materials). In the transmission mode, the illuminating backlights did not show through, indicating an acceptable transmission product.

The % transmission for the invention (38%) provides an acceptable reflection image and allows enough light through the support to be an acceptable transmission image. A display material that functions as both a transmission materials and a reflective materials has significant commercial value as the quality of the display image is robust to lighting factors. Since the display material can function in both transmission and reflection, inventories can be consolidated in manufacturing and at the processing lab. Further, concentration of the tint materials and the white pigments in the biaxially oriented sheet allows for improved manufacturing efficiency and lower material utilization resulting in a lower cost display material. The a* and L* for the invention are consistent with high quality reflective and transmission display materials. Finally the invention would be lower in cost over prior art materials, as a 4.0 mil polyester base was used in the invention compared to a 8.7 mil polyester for prior art photographic display materials.

Finally, because of the duplitized light sensitive silver halide coating, the invention had a developer time of 45 seconds, compared to a developer time of 110 seconds for prior art transmission display materials, as prior art materials used heavy coverage on just the top side. A 45 second developer time has significant commercial value in that the display material of this invention can increase the productivity of expensive processing equipment.

The invention has been described in detail with particular reference to preferred embodiments thereof, but it will be understood that variations and modifications can be effected within the spirit and scope of the invention.

What is claimed is:

1. An photographic element comprising a transparent polymer sheet, at least one layer of biaxially oriented polyolefin sheet and at least one image layer, wherein said polymer sheet has a stiffness of between 20 and 100 millinewtons said biaxially oriented polyolefin sheet has a spectral transmission between 35% and 90%, said biaxially oriented polyolefin sheet has a reflection density less than 65%.

2. The photographic element of claim 1 wherein said biaxially oriented polyolefin sheet contains white pigment.

3. The photographic element of claim 1 wherein said biaxially oriented polyolefin sheet further comprises microvoids.

4. The photographic element of claim 3 wherein said microvoids comprise at least one layer of said biaxially oriented polyolefin sheet and have at least 6 voids in the vertical direction at substantially every point of the biaxially oriented polyolefin sheet.

5. The photographic element of claim 1 wherein said biaxially oriented polyolefin sheet has an integral layer of polyethylene on the top of said sheet.

6. The photographic element of claim 1 wherein said biaxially oriented sheet comprises between 3 and 18 weight percent of titanium dioxide.

7. The photographic element of claim 6 wherein said titanium dioxide is in a layer above a microvoided layer of said biaxially oriented polyolefin sheet.

8. The photographic element of claim 1 wherein said element has a reflection density of between 58 and 62%.

9. The photographic element of claim 1 wherein said transparent polymer sheet is substantially free of pigment.

10. The photographic element of claim 1 wherein said at least one image layer comprises it least one imaging layer containing silver halide and a dye forming coupler located on the top side of said imaging element.

11. The photographic element of claim 10 wherein said at least one image layer comprises at least one dye forming layer on the opposite side of said transparent polymer sheet from the biaxially oriented polyolefin sheet.

12. The photographic element of claim 10 wherein said at least one dye forming layer on the opposite side of said transparent polymer sheet from the biaxially oriented polyolefin sheet has substantially less dye forming coupler than the imaging layer on the same side as the biaxially oriented polyolefin sheet.

13. The photographic element of claim 12 wherein the at least one dye forming layer on the opposite side comprises about the same amount of dye forming coupler of the imaging layer on the same side as the biaxially oriented polyolefin sheet.

14. A method of imaging comprising providing an photographic element comprising a transparent polymer sheet, at least one layer of biaxially oriented polyolefin sheet and at least one image layer comprising silver halide and a dye forming coupler, wherein said polymer sheet has a stiffness of between 20 and 100 millinewtons, and said biaxially oriented polyolefin sheet has a spectral transmission between 35% and 90%, said biaxially oriented polyolefin sheet has a reflection density less than 65%, exposing said image layer, and developing an image.

15. The method of claim 14 wherein said photographic element comprises at least one dye forming layer comprising silver halide and dye forming coupler on the opposite side of said transparent polymer sheet from the biaxially oriented polyolefin sheet and said exposure of both coupler containing layers is from the side of said imaging element having the biaxially oriented polyolefin sheet.

16. The method of claim 14 wherein said exposing is by means of a collimated beam of visible energy.

17. The method of claim 16 wherein said collimated beam comprises a laser beam.

18. The method of claim 16 wherein said developing is carried out in less than 50 seconds.

19. A photographic element comprising at least one silver halide imaging layer and a base for said at least one imaging layer wherein said base comprises a transparent polymer sheet and at least one layer of biaxially oriented polyolefin sheet, wherein said polymer sheet has a stiffness of between 20 and 100 millinewtons, said biaxially oriented polyolefin sheet has a spectral transmission between 35% and 90%, said biaxially oriented polyolefin sheet has a reflection density less than 65%.

* * * * *